(12) United States Patent
Koshisaka et al.

(10) Patent No.: US 11,442,887 B2
(45) Date of Patent: Sep. 13, 2022

(54) COMMUNICATION DEVICE, COMMUNICATION METHOD, PROGRAM, AND COMMUNICATION SYSTEM

(71) Applicant: Sony Semiconductor Solutions Corporation, Kanagawa (JP)

(72) Inventors: Naohiro Koshisaka, Kanagawa (JP); Hiroo Takahashi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 165 days.

(21) Appl. No.: 16/618,581

(22) PCT Filed: May 25, 2018

(86) PCT No.: PCT/JP2018/020124
§ 371 (c)(1),
(2) Date: Dec. 2, 2019

(87) PCT Pub. No.: WO2018/225536
PCT Pub. Date: Dec. 13, 2018

(65) Prior Publication Data
US 2020/0159689 A1    May 21, 2020

(30) Foreign Application Priority Data
Jun. 8, 2017    (JP) .............................. JP2017-113850

(51) Int. Cl.
*G06F 13/42*    (2006.01)
*G06F 13/364*    (2006.01)
(Continued)

(52) U.S. Cl.
CPC ........ *G06F 13/4291* (2013.01); *G06F 13/364* (2013.01); *G06F 13/387* (2013.01);
(Continued)

(58) Field of Classification Search
CPC ..................................................... G06F 3/0488
See application file for complete search history.

(56) References Cited

U.S. PATENT DOCUMENTS

2012/0066423 A1    3/2012  Choo et al.
2015/0339248 A1*  11/2015  Choi ................... G06F 13/4282
                                                                710/110
(Continued)

FOREIGN PATENT DOCUMENTS

| JP | 6321221 B2 | 5/2018 |
| WO | 2017/061330 A | 1/2013 |
| WO | 2015/145347 A1 | 10/2015 |

OTHER PUBLICATIONS

European Patent Office Communication Pursuant to Article 94 (3) EPC dated Jan. 11, 2021 for corresponding European Application No. 18730458.9.

(Continued)

*Primary Examiner* — Henry Tsai
*Assistant Examiner* — Juanito Borromeo
(74) *Attorney, Agent, or Firm* — Michael Best & Friedrich LLP

(57) ABSTRACT

To perform communication more definitely and efficiently. In order to perform communication in which a group address is used setting a plurality of arbitrary slaves to a single group and setting the group to a destination, a slave having a group-belonging capability capable of belonging to the group and performing communication is recognized. Then, in a state in which a slave having the group-belonging capability and a slave having no group-belonging capability mixedly join in a bus, the group address is assigned to the slave recognized to have the group-belonging capability. The present technology is, for example, applicable to a bus IF.

16 Claims, 17 Drawing Sheets

(51) Int. Cl.
     *G06F 13/38*      (2006.01)
     *G06F 13/40*      (2006.01)

(52) U.S. Cl.
     CPC ........ *G06F 13/404* (2013.01); *G06F 13/4068* (2013.01); *G06F 2213/0016* (2013.01); *G06F 2213/0052* (2013.01)

(56) References Cited

U.S. PATENT DOCUMENTS

2016/0364353 A1* 12/2016 Sengoku ............. G06F 13/1673
2017/0115987 A1   4/2017 Peixoto Machado Da Silva et al.
2017/0255588 A1*  9/2017 Pitigoi-Aron ......... G06F 13/364

OTHER PUBLICATIONS

Taiwanese Office Action dated Jun. 22, 2021 for corresponding Taiwanese Application No. 107117657.
MIPI Alliance,"Specification for I3C",Improved inter Integrated Circuit,Version 1.0, Public Release Edition, Dec. 23, 2016.

\* cited by examiner

F I G . 3

A

| CURRENT MASTER | DEVICE A | | | | | | |
|---|---|---|---|---|---|---|---|
| DEVICE | FUNCTION | SA | DA | GROUP INFORMATION EFFECTIVENESS | GROUP MANAGEMENT CAPABILITY | GROUP-BELONGING-CAPABILITY | GRPA |
| A | I3C MAIN MASTER | ABSENT | DA VALUE | PRESENT | PRESENT | ABSENT | ABSENT |
| B | I3C SECONDARY MASTER | ABSENT | DA VALUE | PRESENT | PRESENT | ABSENT | ABSENT |
| C | I3C SECONDARY MASTER | ABSENT | DA VALUE | PRESENT | ABSENT | ABSENT | ABSENT |
| D | I3C SLAVE | ABSENT | DA VALUE | PRESENT | ABSENT | PRESENT | GRPA VALUE |
| E | I3C SLAVE | ABSENT | DA VALUE | PRESENT | ABSENT | PRESENT | GRPA VALUE |
| F | I3C SLAVE | SA VALUE | DA VALUE | PRESENT | ABSENT | PRESENT | GRPA VALUE |
| G | I3C SLAVE | SA VALUE | DA VALUE | PRESENT | ABSENT | ABSENT | ABSENT |
| H | I2C SLAVE | SA VALUE | ABSENT | PRESENT | ABSENT | ABSENT | ABSENT |

B

| CURRENT MASTER | DEVICE A | | |
|---|---|---|---|
| DEVICE | FUNCTION | SA | DA |
| A | I3C MAIN MASTER | ABSENT | DA VALUE |
| B | I3C SECONDARY MASTER | ABSENT | DA VALUE |
| C | I3C SECONDARY MASTER | ABSENT | DA VALUE |
| D | I3C SLAVE | ABSENT | DA VALUE |
| E | I3C SLAVE | ABSENT | DA VALUE |
| F | I3C SLAVE | SA VALUE | DA VALUE |
| G | I3C SLAVE | SA VALUE | DA VALUE |
| H | I2C SLAVE | SA VALUE | ABSENT |

FIG. 10

| SETGRPA | | | | | | | |
|---|---|---|---|---|---|---|---|
| S | 7'h7E /W/ACK | SETGRPA CCC /T | Sr | Slave Addr /W/ACK | GRPA slot#1 GRPA/valid /T | ... | GRPA slot#n GRPA/valid /T | Sr | 7'h7E P |

FIG.11

| DEFGRPS | | | | | | | | | | |
|---|---|---|---|---|---|---|---|---|---|---|
| S/Sr- | 7'h7E /W/ACK | DEFGRPS CCC /T | Count /T | Describes Current Master | | | Describes First Slave (Any additional Slaves will follow) | | | Sr/P |
| | | | | DA /O/T | GRPCAP /T | GRPA/ GAvalid /T | SAorDA /O/T | GRPCAP /T | GRPA/ GAvalid /T | 7'h7E |

FIG. 12

| DEFGRPS | | | | | |
|---|---|---|---|---|---|
| Sr | 7'h7E /W/ACK | DEFGRPS CCC /T | Count /T | Describes Current Master | Describes First Slave (Any additional Slaves will follow) | Sr | 7'h7E | P |

| Describes Current Master | | Describes First Slave (Any additional Slaves will follow) | |
|---|---|---|---|
| DA/GRP MANAGEMENT cap/T | GRPA/GRP BELONGING cap/T | DA/GRP MANAGEMENT cap/T | GRPA/GRP BELONGING cap/T |

COMMUNICATION DEVICE, COMMUNICATION METHOD, PROGRAM, AND COMMUNICATION SYSTEM

TECHNICAL FIELD

The present disclosure relates to a communication device, a communication method, a program, and a communication system, and more particularly to a communication device, a communication method, a program, and a communication system aiming at enabling communication to be more definitely and efficiently performed.

BACKGROUND ART

Conventionally, a CCI (Camera Control Interface) has been widely used as a bus IF (Interface) for controlling a register in various devices and an I2C (Inter-Integrated Circuit) standard has been adopted for a physical layer in the CCI. In addition, recently, speeding up of I2C has been requested to be realized, regulations of I3C (Improved Inter Integrated Circuit) are plotted out as a next-generation standard, and a revision thereof has been promoted.

For example, I2C and I3C are configured so as to perform communication with a slave connected to the bus IF under the control by a master having a communication initiative through the bus IF, Further, in I3C, a function of maintaining compatibility so as to perform communication with a device of I2C, a function referred to as hot join capable of joining in the bus IF on the way by the slave, a function of mutually transferring a master authority between a plurality of masters, or the like is provided.

Also, in PTL 1, in I3C, an error detection method is defined so that a communication failure is avoided coming along with an error detection of a start or stop of communication or the like, and thereby a communication device capable of performing communication more definitely is disclosed.

CITATION LIST

Patent Literature

PTL 1: PCT Patent Publication No. WO2017/061330

SUMMARY OF INVENTION

Technical Problem

Meanwhile, in a current standard of I3C, it is regulated that communication is performed setting to a destination all the devices connected to the bus IF and communication is performed setting to a destination a single arbitrary device connected to the bus IF.

Therefore, for example, when a write of the same contents is desired to be performed in a plurality of arbitrary devices connected to the bus IF, a master has to repeatedly perform a write transfer individually to their devices. Accordingly, in order to enable communication to be efficiently performed, it is considered that a method for performing communication setting to a destination a plurality of arbitrary devices is established. Then, it is necessary to avoid a communication error concerned to occur accompanying a performance of communication by such a method and to definitely perform communication.

The present disclosure has been made in view of the circumstances as described above and aims at enabling communication to be more definitely and efficiently performed.

Solution to Problem

According to an aspect of the present disclosure, there is provided a communication device having a communication initiative through a bus, including a transmission and reception control unit configured to control transmission and reception of a signal with another communication device that performs communication under control of the communication device, and a processing execution unit configured to execute a process for recognizing the other communication device having a group-belonging capability capable of belonging to a group and performing communication to perform communication in which a group address is used setting a plurality of the other arbitrary communication devices to the single group and setting the group to a destination from among two or more of the other communication devices joining in the bus, and a process for assigning the group address to the other communication device recognized to have the group-belonging capability.

According to another aspect of the present disclosure, there is provided a communication method performed by a communication device having a communication initiative through a bus or a program for causing a computer built in a communication device having a communication initiative through a bus to execute a process, including the steps of: controlling transmission and reception of a signal with another communication device that performs communication under control of the communication device, executing a process for recognizing the other communication device having a group-belonging capability capable of belonging to a group and performing communication to perform communication in which a group address is used setting a plurality of the other arbitrary communication devices to the single group and setting the group to a destination among from two or more of the other communication devices joining in the bus, and executing a process for assigning the group address to the other communication device recognized to have the group-belonging capability.

According to still another aspect of the present disclosure, there is provided a communication system in which communication is performed by a communication device having a communication initiative through a bus and another communication device performing communication under control of the communication device, in which the communication device includes a transmission and reception control unit configured to control transmission and reception of a signal with the other communication device, and a processing execution unit configured to execute a process for recognizing the other communication device having a group-belonging capability capable of belonging to a group and performing communication to perform communication in which a group address is used setting a plurality of the other arbitrary communication devices to the single group and setting the group to a destination from among two or more of the other communication devices joining in the bus, and a process for assigning the group address to the other communication device recognized to have the group-belonging capability.

According to an aspect of the present disclosure, transmission and reception of a signal is controlled with another communication device that performs communication under control of the communication device, a process for recognizing the other communication device having a group-belonging capability capable of belonging to a group and performing communication is executed to perform communication in which a group address is used setting a plurality of the other arbitrary communication devices to the single group and setting the group to a destination from among two or more of the other communication devices joining in the bus, and a process for assigning the group address to the other communication device recognized to have the group-belonging capability is executed.

Advantageous Effects of Invention

According to an aspect of the present disclosure, communication can be performed more definitely and efficiently.

Note that effects here described are not necessarily limited and may be any effect described in the present disclosure.

BRIEF DESCRIPTION OF DRAWINGS

FIG. 3 is a diagram illustrating an example of a table in which device information is registered.

FIG. 10 is a diagram illustrating a second format example of the SETGRPA command.

FIG. 11 is a diagram illustrating a first format example of a DEFGRPS command.

FIG. 12 is a diagram illustrating a second format example of the DEFGRPS command.

DESCRIPTION OF EMBODIMENT

Hereinafter, a specific embodiment to which the present technology is applied will be described in detail with reference to the accompanying drawings.

<Configuration Example of Bus IF>

Figure 1:
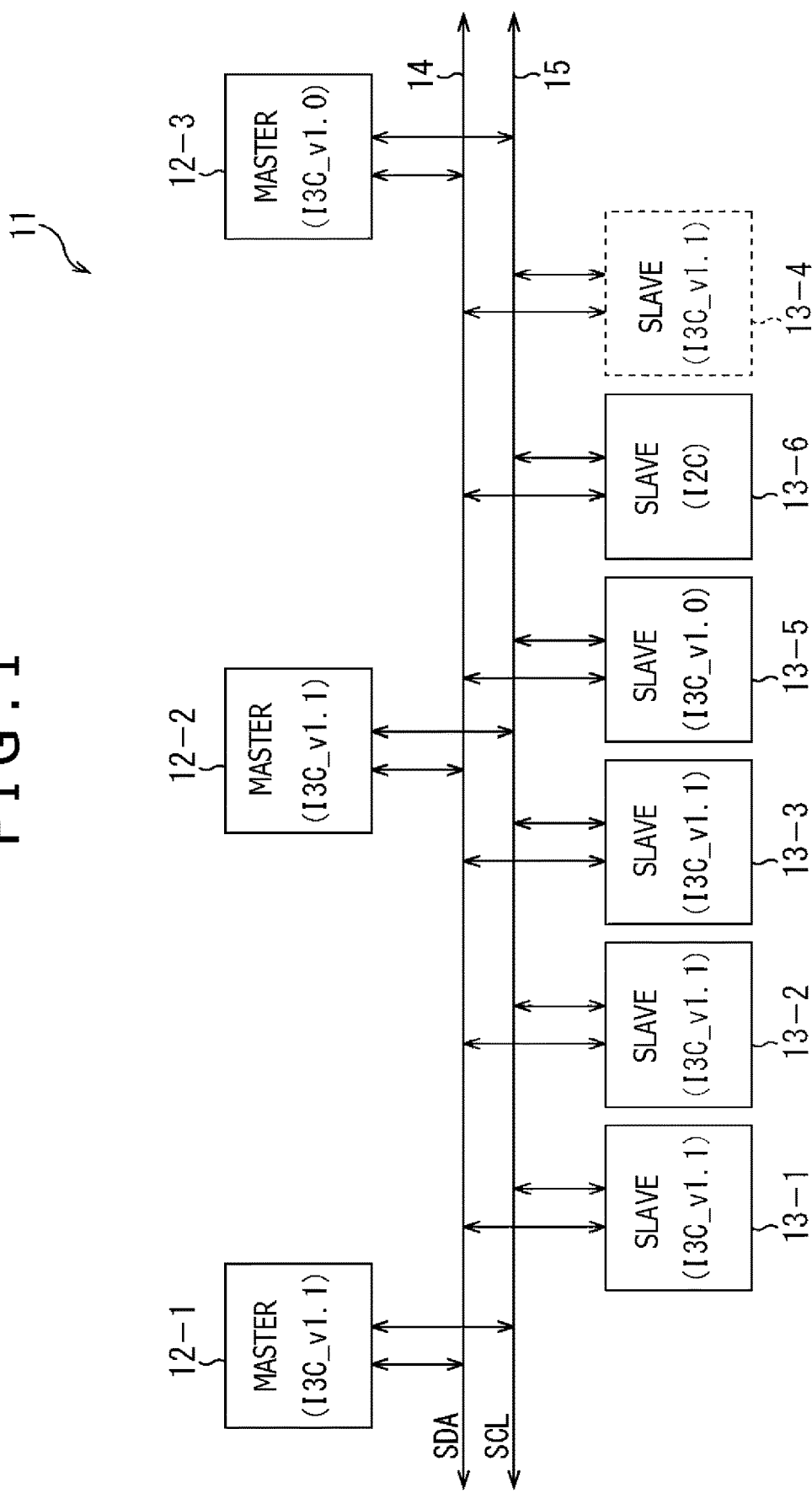
FIG. 1 is a block diagram illustrating a configuration example of an embodiment of a bus IF to which the present technology is applied.

FIG. 1 is a block diagram illustrating a configuration example of an embodiment of a bus IF to which the present technology is applied.

In the bus IF 11 illustrated in FIG. 1, three masters 12-1 to 12-3 and six slaves 13-1 to 13-6 are connected through a data signal line 14 for transmitting serial data SDA and a clock signal line 15 for transmitting a serial clock SCL.

The masters 12-1 and 12-2 and the slaves 13-1 to 13-4 conform to the standard (I3C_v1.1) of I3C of a newly proposed version. Also, the master 12-3 and the slave 13-5 conform to the standard (I3C_v1.0) of I3C of a current version, and the slave 13-6 conforms to the standard of I2C. As described above, even if the devices conforming to I3C_v1.1, the devices conforming to I3C_v1.0, and the device conforming to the standard of I2C are mixed, the bus IF 11 is configured so as to be operated.

In addition, in I3C, hot join that is a function capable of joining in the bus IF 11 in a state of being operated on the way is regulated. The slave 13-4 illustrated in FIG. 1 by a broken line indicates, for example, a state in which the slave 13-4 is powered off and does not join in the bus IF 11. After power-on, the slave 13-4 can transmit a hot join request and join in the bus IF 11.

The masters 12-1 to 12-3 include a function of vigorously controlling communication through the bus IF 11 and the slaves 13-1 to 13-6 can perform communication through the bus IF 11 under the control of a single master having the initiative of the masters 12-1 to 12-3. Note that, hereinafter appropriately, when the masters 12-1 to 12-3 do not need to be differentiated, they are simply referred to as the masters 12, whereas when the slaves 13-1 to 13-6 do not need to be differentiated, they are simply referred to as the slaves 13.

In addition, from among the masters 12-1 to 12-3, one master 12 having the communication initiative (hereinafter, referred to as a master authority) in the bus IF 11 is referred to as a current master 12C and the other masters 12 are referred to as a secondary master 12S. For example, the secondary master 12S having no master authority can perform communication through the bus IF 11 under the control of the current master 12C, and when the master authority is transferred from the current master 12C, the secondary master 12S functions as the current master 12C. As described above, the master 12 functions as the current master 12C in the state of having the communication initiative and the secondary master 12S in the state of having no communication initiative is treated in the similar manner as in the slave 13. Accordingly, in the present embodiment, also the secondary master 12S that performs communication under control of the current master 12C will be described being included in the slave 13.

Here, hereinafter appropriately, the slaves 13-1 to 13-4 conforming to I3C_v1.1 and the slave 13-5 conforming to I3C_v1.0 are also referred to as I3C slave 13. Further, the devices (that is, the master 12 and the I3C slave 13) conforming to any of I3C_v1.1 and I3_v1.0 are also referred to as the I3C device.

Meanwhile, in I3C_v1.1, setting a plurality of arbitrary DC slaves 13 to a destination, the current master 12C is examined to set and operate a group address that enables a write transfer to be concurrently performed to their I3C slaves 13.

Figure 6:
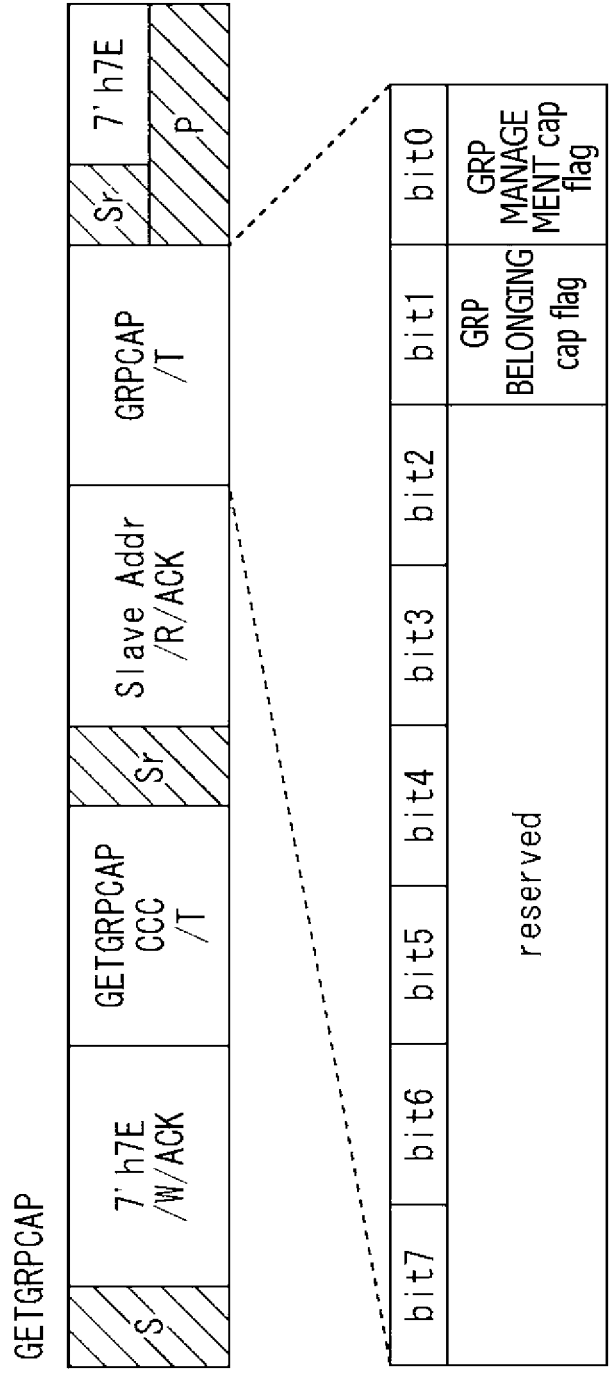
FIG. 6 is a diagram illustrating a first format example of a GETGRPCAP command.
Figure 7:
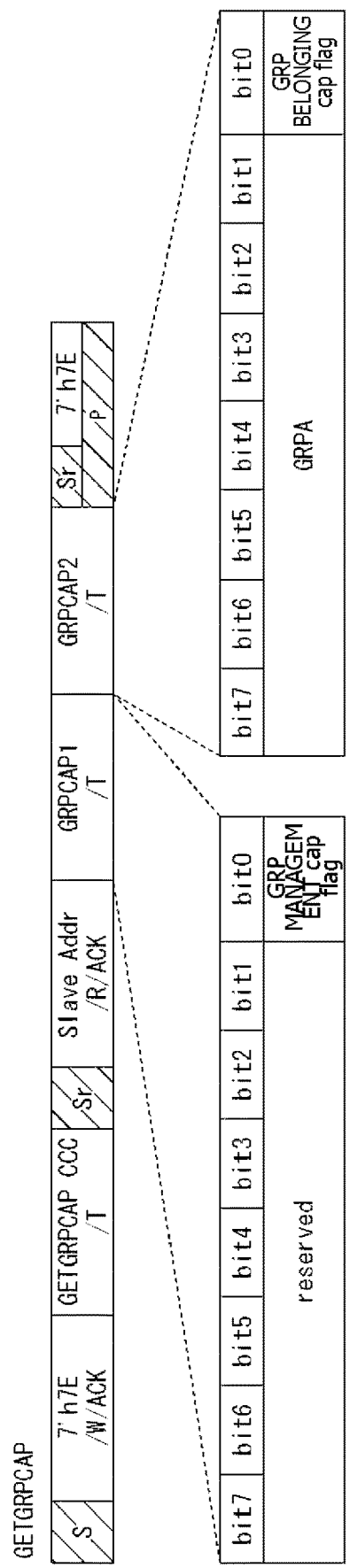
FIG. 7 is a diagram illustrating a second format example of the GETGRPCAP command.
Figure 8:
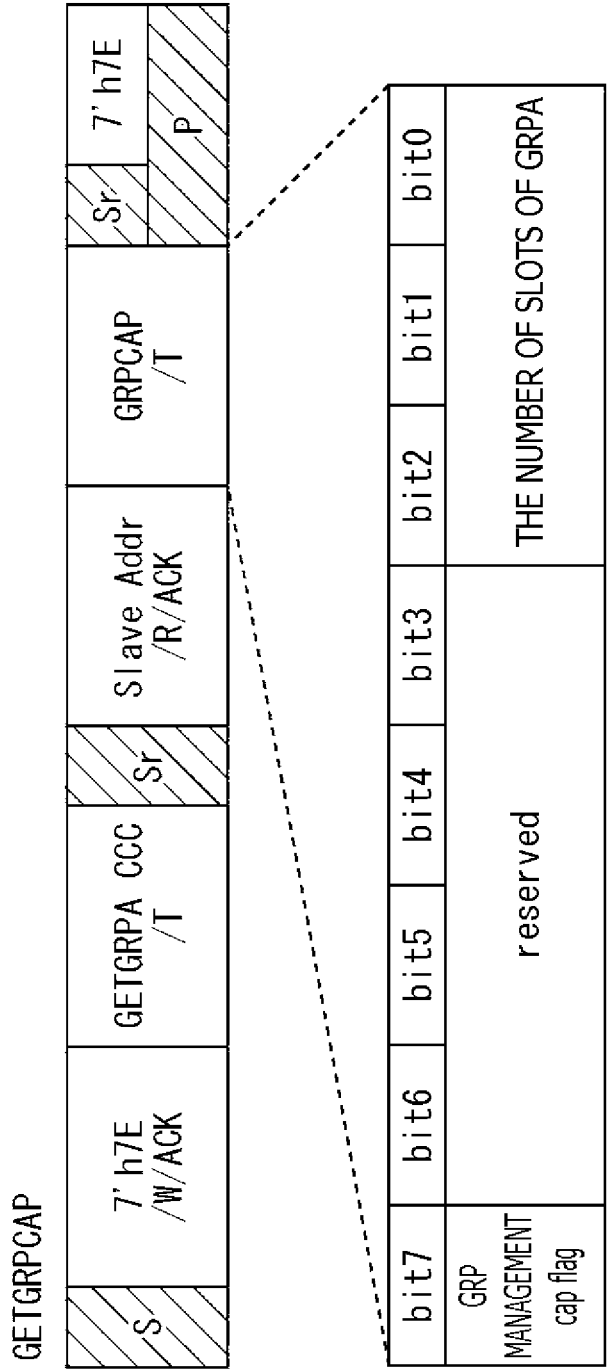
FIG. 8 is a diagram illustrating a third format example of the GETGRPCAP command.

That is, by defining a SETGRPA command of formats as illustrated in FIGS. 6 to 8 to be described below, the same group address is set to a plurality of I3C slaves 13 belonging to the same group. For example, by setting the dynamic address for each group, the dynamic address can be used as the group address. Note that a single I3C slave 13 can belong to a plurality of groups and at least one or more of group addresses can be assigned to the single I3C slave 13.

For example, the current master 12C sets the group address to respective groups by using the SETGRPA command. Then, on the occasion of performing various types of write transfers (Direct Write CCC/Private Write/HDR Write) regulated by I3C, the current master 12C designates the group address to a slave address field of the command of the write transfer. Through this process, the current master 12C can concurrently write data in a plurality of I3C slaves 13 belonging to the group by a one-time write transfer.

Meanwhile, the DC slave 13 receives communication relating to an address 7'h7E for designating all the I3C slaves 13 joining in the bus IF 11, the dynamic address of the I3C slave 13 itself, or the group address to which the I3C slave 13 itself belongs and executes processing according to contents of the communication.

Figure 15:
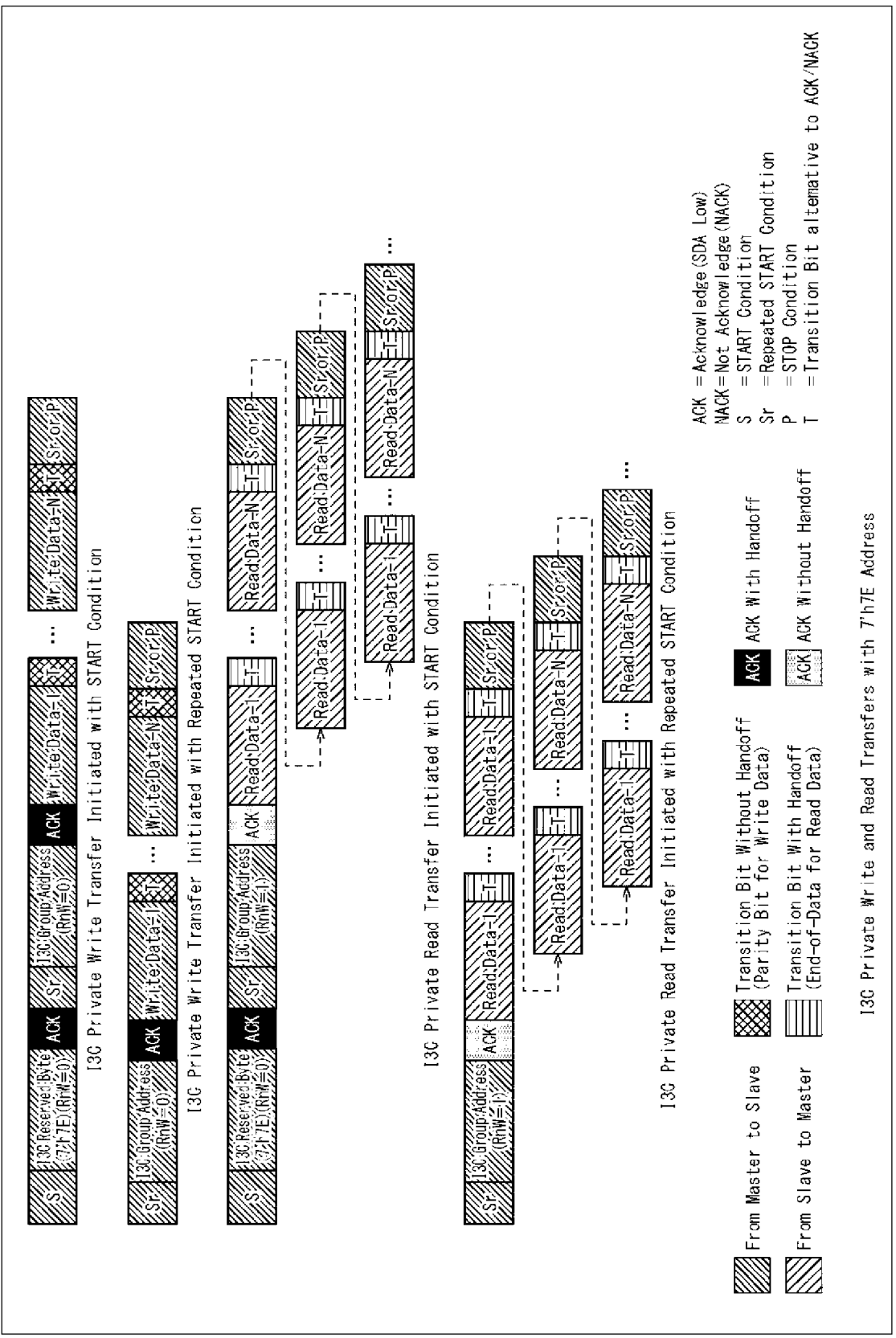
FIG. 15 is a diagram illustrating an example of a communication format in the write transfer and a readout transfer.
Figure 16:
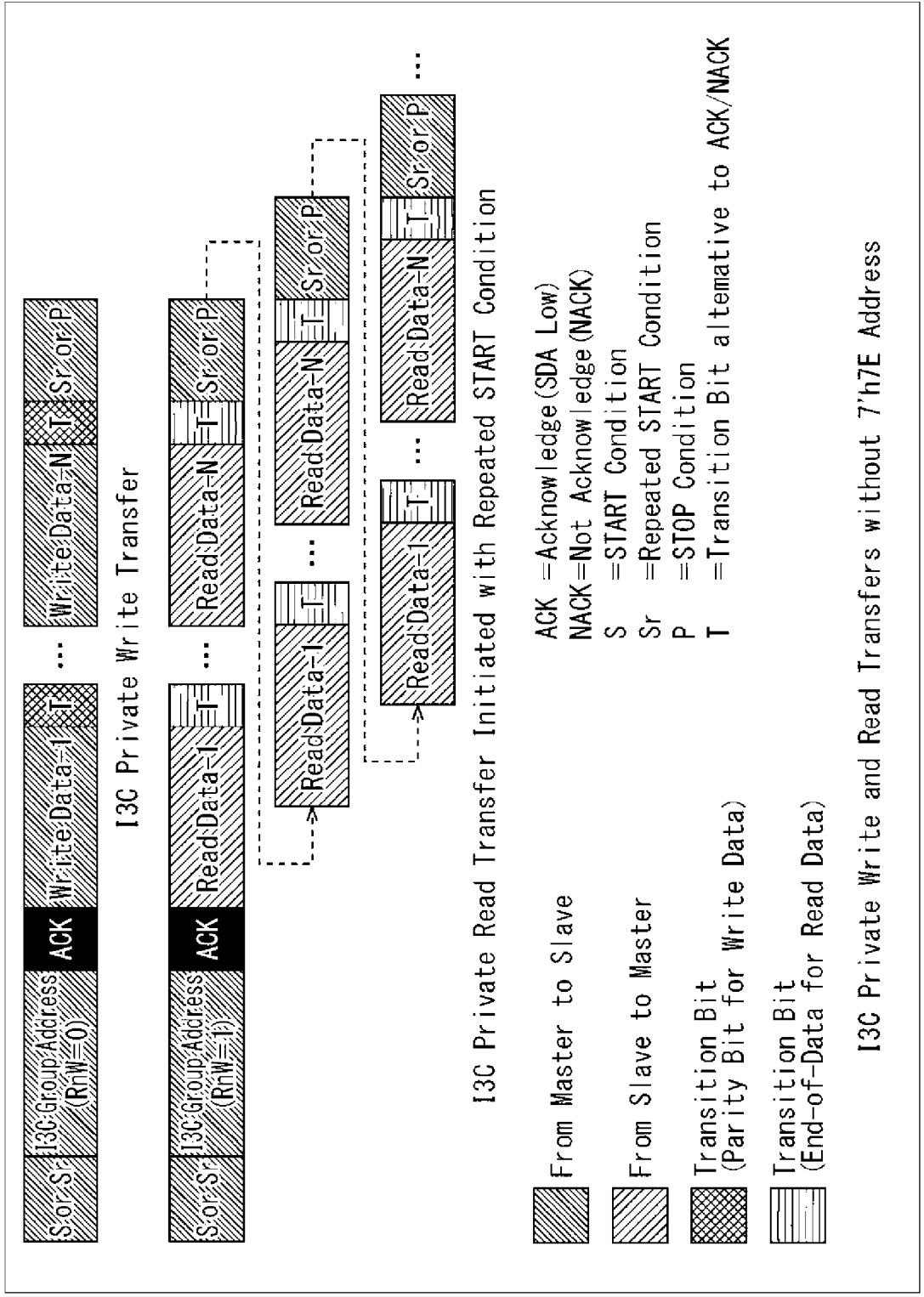
FIG. 16 is a diagram illustrating an example of the communication format in the write transfer and the readout transfer.
Figure 17:
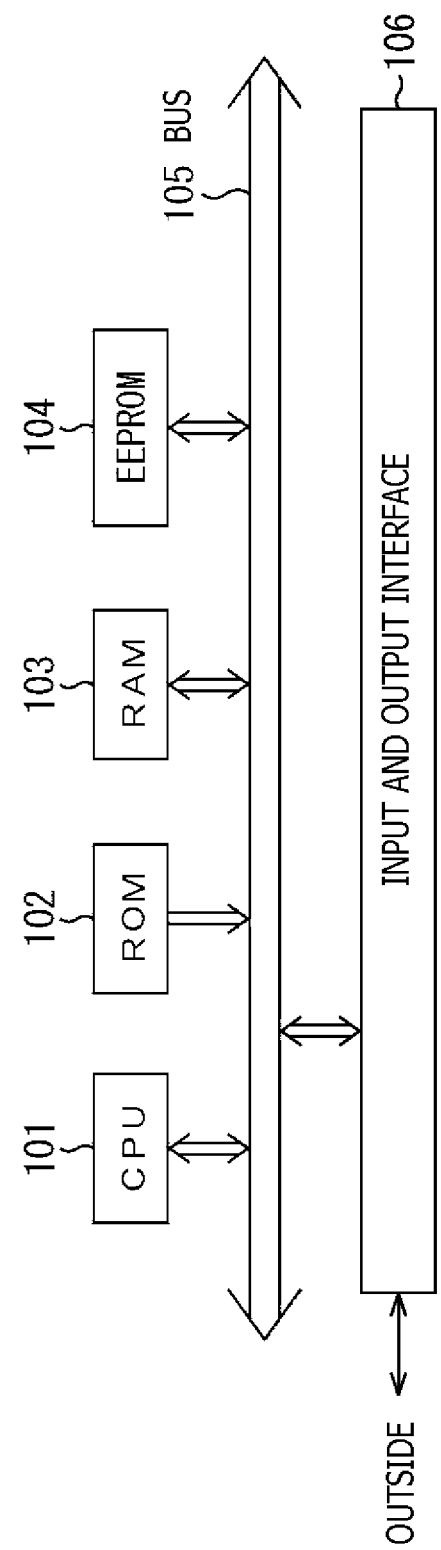
FIG. 17 is a block diagram illustrating a configuration example of an embodiment of a computer to which the present technology is applied.

In addition, when the current master 12C performs designation using the group address and transmits the readout command to the plurality of I3C slaves 13, the readout data transferred from the plurality of I3C slaves 13 is estimated to conflict. Therefore, an operation is assumed in which on the occasion of performing various types of readout transfer (Direct Read CCC/Private Read/HDR Read) regulated by I3C, the group address is prohibited to be designated to a slave address field of the command of the readout transfer. Note that, as illustrated in FIG. 15 and FIG. 16 to be described below, when a timing at which the readout data is output for each of the plurality of I3C slaves 13 is controlled, the conflict of the readout data can be avoided. In this case, on the occasion of performing various types of readout transfer, the bus IF 11 can be operated without prohibiting designating the group address. Further, a register etc. may be installed to enable the readout transfer in which the group address is designated.

Meanwhile, the bus IF 11 illustrated in FIG. 1 is formed as a mixture of the masters 12-1 and 12-2 and I3C slaves 13-1 to 13-4 conforming to I3C_v1.1 in which a function relating to the group address is regulated, the master 12-3 and I3C slave 13-5 conforming to I3C_v1.0 in which the function relating to the group address is not regulated, and the I2C slave 13-6 conforming to the standard of I2C.

In the bus IF 11 configured as described above, in order to perform an assignment of the group address through the masters 12-1 and 12-2, I3C_v1.1 needs to be regulated so as to recognize the I3C device corresponding to the group address of all the masters 12 and slaves 13 joining in the bus IF 11.

In addition, when a plurality of masters 12 joining in the bus IF 11 correspond to the group address, I3C_v1.1 needs to be regulated so that those masters 12 can mutually recognize the group address to which the other masters 12 assign. That is, there is a concern that when some masters 12 cannot recognize the group address assigned by the other masters 12, an already used address value has been used for the group address and a communication error occurs. In addition, there is a concern that the group address set by some masters 12 is rewritten by the other masters 12, and thereby group address information is broken and the communication error occurs.

In order to solve the problems, when operating the group address, the masters 12-1 and 12-2 conforming to I3C_1.1 are configured so that a corresponding state to the group address can be recognized and the communication error concerned to occur due to the usage of the group address can be avoided. This process permits the communication error to be definitely avoided and communication to be efficiently performed using the group address in the bus IF 11.

<Configuration Example of Master and Slave>

Figure 2:
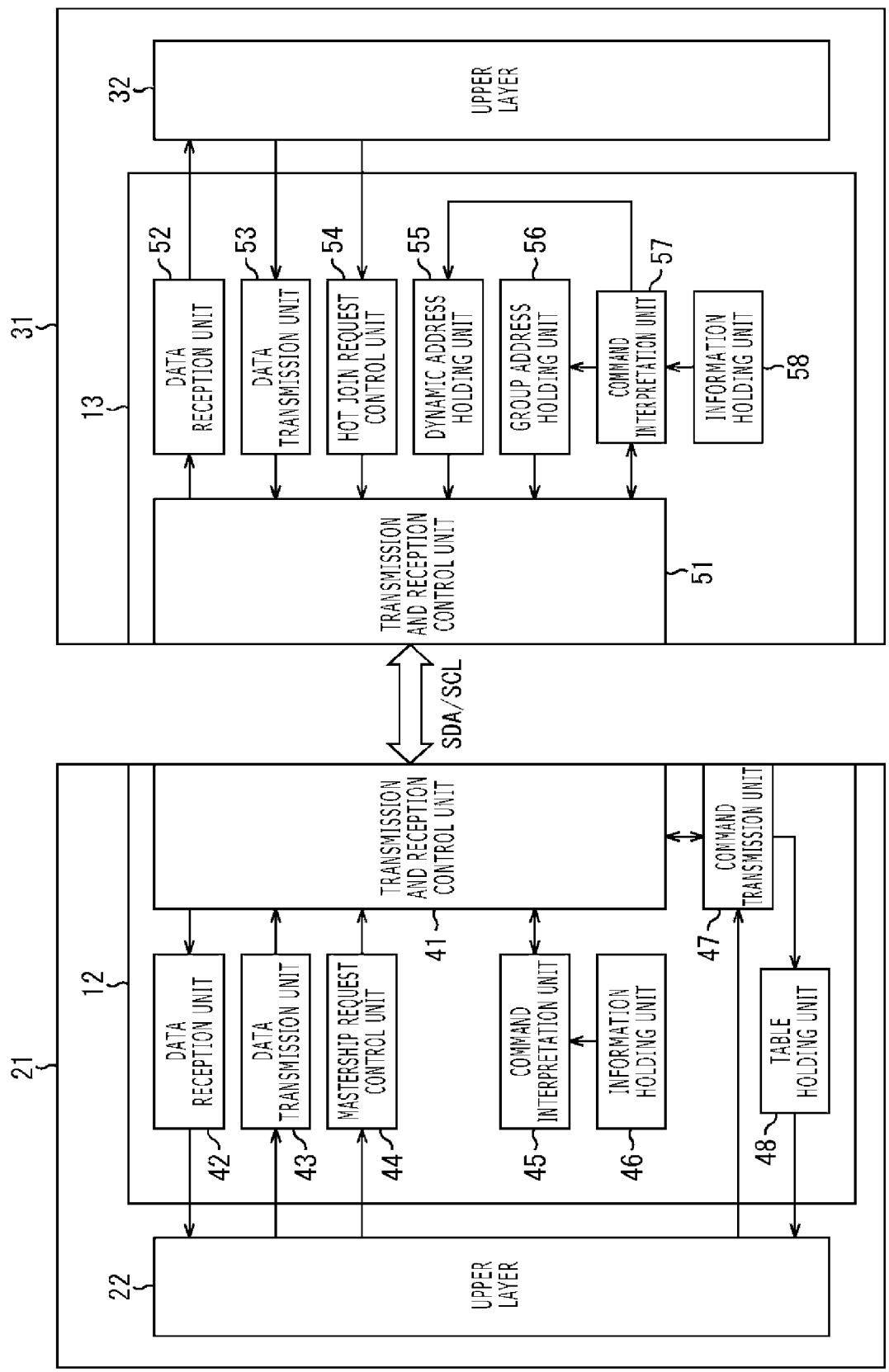
FIG. 2 is a block diagram illustrating a configuration example of a master and a slave.

FIG. 2 is a block diagram illustrating a configuration example of the master 12 and the slave 13.

In a configuration illustrated in FIG. 2, the master 12 is incorporated as a physical layer of the master device 21 and the master device 21 includes an upper layer 22 (for example, a CCI layer) that is in an upper position to the master 12. In the similar manner, the slave 13 is incorporated as a physical layer of the slave device 31 and the slave device 31 includes an upper layer 32 (for example, a CO layer) that is in an upper position to the slave 13.

As illustrated in FIG. 2, the master 12 includes a transmission and reception control unit 41, a data reception unit 42, a data transmission unit 43, a mastership request control unit 44, a command interpretation unit 45, an information holding unit 46, a command transmission unit 47, and a table holding unit 48. Note that each unit or a portion of these units may be realized, for example, by using a semiconductor integrated circuit, a programmable semiconductor integrated circuit, software, or the like.

The transmission and reception control unit 41 controls transmission and reception of signals with the other devices connected to the bus IF 11. For example, the transmission and reception control unit 41 drives the clock signal line 15, transmits the serial clock SCL, and drives the data signal line 14 in accordance with a timing of the serial clock SCL, and thereby controls transmission of the serial data SDA to the other devices. In addition, in accordance with the timing of the serial clock SCL, the transmission and reception control unit 41 controls the reception of the serial data SDA that is transmitted by driving the data signal line 14 through the other devices.

Under the control of the transmission and reception control unit 41, the data reception unit 42 receives data transmitted from the other devices and supplies the data to the upper layer 22.

Under the control of the transmission and reception control unit 41, the data transmission unit 43 transmits the data supplied from the upper layer 22 to the other devices.

In accordance with a request from the upper layer 22, when the master 12 is the secondary master 12S, the mastership request control unit 44 performs control relating to transmission of a mastership request for requesting the master authority to be transferred from the current master 12C.

The command interpretation unit 45 performs an interpretation of the command received under the control of the transmission and reception control unit 41 and executes processing according to the command with reference to various types of information held by the information holding unit 46.

The information holding unit 46 can hold various types of information required for executing processing according to the command through the command interpretation unit 45. In the information holding unit 46, for example, there is held group-related capability information that is a capability relating to the group and is information indicating a capability included in the master 12 itself. For example, when the master 12 itself has a capability (hereinafter, also referred to as a group management capability) for assigning the group address, the group-related capability information indicating that the group management capability is included is held by the information holding unit 46.

In accordance with the request from the upper layer 22, the command transmission unit 47 transmits the command through the bus IF 11 under the control of the transmission and reception control unit 41. In addition, in accordance with the command transmitted from the master 12, for example, the command transmission unit 47 supplies the group-related capability information transmitted from the device joining in the bus IF 11 to the table holding unit 48.

The table holding unit 48 holds a device information table (refer to FIG. 3 to be described below) in which the device information associated with respective devices is registered, while associated to all the devices joining in the bus IF 11. In the device information table, for example, the device information including the group-related capability information, the group address, or the like is registered, while associated to a device ID (Identification) that identifies the device. Then, the table holding unit 48 holds the group-related capability information of each device supplied from the command transmission unit 47 in the device information table, and at the same time notifies also the upper layer 22 of the group-related capability information.

The slave 13 includes a transmission and reception control unit 51, a data reception unit 52, a data transmission unit 53, a hot join request control unit 54, a dynamic address holding unit 55, a group address holding unit 56, a command interpretation unit 57, and an information holding unit 58. Note that each unit or a portion of these units may be realized, for example, by using a semiconductor integrated circuit, a programmable semiconductor integrated circuit, software, or the like.

The transmission and reception control unit 51 controls transmission and reception of signals with the other devices connected to the bus IF 11. For example, in accordance with the timing of the serial clock SCL, the transmission and reception control unit 51 controls reception of the serial data SDA transmitted by driving the data signal line 14 through the other devices. Also, in accordance with the timing of the serial clock SCL, the transmission and reception control unit 51 drives the data signal line 14 and thereby controls transmission of the serial data SDA to the other devices.

Under the control of the transmission and reception control unit 41, the data reception unit 52 receives data transmitted from the other devices and supplies the data to the upper layer 32.

Under the control of the transmission and reception control unit 41, the data transmission unit 53 transmits the data supplied from the upper layer 32 to the other devices.

The hot join request control unit 54 performs, for example, control relating to the transmission of the hot join request for requesting the slave 13 in the state of not joining in the bus IF 11 to join in the bus IF 11 in the operating state.

The dynamic address holding unit 55 can hold the dynamic address assigned to the slave 13 and appropriately holds the dynamic address in accordance with an instruction by the command interpretation unit 57.

The group address holding unit 56 can hold the group address assigned to the slave 13 and appropriately holds the group address in accordance with the instruction by the command interpretation unit 57.

The command interpretation unit 57 performs an interpretation of the command received under the control of the transmission and reception control unit 51, refers to various types of information held by the information holding unit 58, and executes processing according to the command.

The information holding unit 58 can hold various types of information required for executing command processing according to the command through the command interpretation unit 57. In the information holding unit 58, for example, there is held the group-related capability information that is information indicating a capability that relates to the group and is included in the slave 13 itself. For example, when the slave 13 itself has the capability (hereinafter, also referred to as a group-belonging capability) to which the group address is assigned, the group-related capability information indicating that the group-belonging capability is included is held by the information holding unit 58.

Here, the device information table held by the table holding unit 48 will be described with reference to FIG. 3. In FIG. 3A, an example of the device information table held by the table holding unit 48 of the masters 12-1 and 12-2 conforming to I3C_v1.1 is illustrated and in FIG. 3B, an example of the device information table held by the table holding unit 48 of the master 12-3 conforming to I3C_v1.0 is illustrated.

As illustrated in FIG. 3A, in the device information table of I3C_v1.1, the device ID (in an example of FIG. 3, the device ID: A to H) identifying all the devices joining in the bus IF 11 is registered. Then, while associated to respective device IDs, function information, a static address (SA), the dynamic address (DA), group information effective information, group management capability information, group-belonging capability information, and a group address (GRPA) are registered as the device information. In addition, in this device information table, the device ID (in an example of FIG. 3, the device ID: A) of the master 12 that is the current master 12C is registered.

In the function information, the device information indicating functions included in the device joining in the bus IF 11 is registered and, for example, the device information indicating any of an I3C main master, an I3C secondary master, an I3C slave, and an I2C slave is registered.

In the static address, the address value (SA value) indicating the static address included in the device is registered as the device information, and in addition thereto, the device information (none) indicating the fact is registered with regard to the device having no static address.

In the dynamic address, the address value (DA value) indicating the dynamic address assigned to the device is registered as the device information, and in addition thereto, the device information (none) indicating the fact is registered with regard to the device (I2C device) incapable of having the dynamic address. In addition, when the dynamic address can be included but the dynamic address is not yet assigned, the device information (not yet) indicating the fact is registered in the dynamic address.

In the group information effective information, the device information (present) indicating that the device information registered in the group management capability information, the group-belonging capability information, and the group address is effective or the device information (absent) indicating that their device information is not yet acquired is registered.

In the group management capability information, the device information (present) indicating that the device has a capability to which the group address is assigned or the device information (absent) indicating that the device has no capability to which the group address is assigned is registered. In addition, with regard to the device in which the group management capability information is not acquired, the group management capability information is left blank.

In the group-belonging capability information, the device information (present) indicating that the device has a capability to which the group address is assigned or the device information (absent) indicating that the device has no capability to which the group address is assigned is registered. In addition, with regard to the device in which the group-belonging capability information is not acquired, the group-belonging capability information is left blank.

In the group address, the address value (GRPA value) indicating the group address assigned to a group to which the device belongs is registered as the device information. In addition, with regard to the device (the I2C device, the I3C device having no group-belonging capability information, or the like) having no stress in which the group address is assigned, the device information (absent) indicating the fact is registered. Further, in the group address, when the device has the stress in which the group address is assigned but the group address is not yet assigned to the device, the device information (not yet) indicating the fact is registered. Also, with regard to the device in which the group address is not acquired, the group address is left blank.

Also, as illustrated in FIG. 3B, in the device information table of I3C_v1.0, the function information, the static address (SA), and the dynamic address (DA) are registered as the device information from among the device information sets registered in the device information table of I3C_v1.1 while associated with the respective device IDs. That is, in I3C_v1.0, since the group address is not defined, the group information effective information, the group management capability information, the group-belonging capability information, and the group address are not registered in the device information table.

As described above, in the table holding unit 48, there is held the device information table in which an assignment state and the like of the static address, the dynamic address, or the group address are registered.

<Address Assignment Processing>

Referring to a flowchart illustrated in FIG. 4, the process in which the current master 12C assigns the dynamic address and the group address will be described.

For example, when the current master 12C is powered on, the process starts, and in Step S11, the current master 12C performs initialization of itself. Then, the transmission and reception control unit 41 of the current master 12C drives both potentials of the data signal line 14 and the clock signal line 15 to an H level and brings the bus IF 11 into a bus free state.

In Step S12, the current master 12C recognizes the presence of the I3C device having the static address among the I3C devices joining in the bus IF 11. Then, the current master 12C designates the static address of the I3C device and transmits a SETDASA command for instructing the dynamic address to be assigned. In accordance with the above, when the assignment of the dynamic address to the I3C device having the static address is completed, the process advances to Step S13.

In Step S13, the current master 12C performs an ENTDAA command sequence for instructing the dynamic address to be assigned to the remaining I3C devices to which the dynamic address has not been assigned in Step S12. In accordance with the above, when the dynamic address is assigned to all the I3C devices joining in the bus IF 11, the process advances to Step S14.

In Step S14, the current master 12C transmits a DEFSLVS command for instructing the device information to be shared to all the secondary masters 12S joining in the bus IF 11. This process permits the current master 12C to share the device information associated with all the devices joining in the bus IF 11 with the secondary master 12S. Note that, at this time point, the process relating to the group address is not executed, and therefore in the device information shared in Step S14, the device ID, the function information, the static address, and the dynamic address are included from among the device information sets registered in the table illustrated in FIG. 3 to be described above.

In Step S15, the current master 12C refers to the group-related capability information held by the information holding unit 46 and determines whether or not the current master 12C itself has the capability in which the group address is assigned.

In Step S15, when it is determined that the current master 12C has no capability in which the group address is assigned, the process ends. For example, when the current master 12C is the master 12-3 conforming to I3C_v1.0, the current master 12C has no capability in which the group address is assigned. Also, when the capability in which the group address is assigned is regulated to be an option in I3C_v1.1 and the capability is not set to the master 12-1 or 12-2 that is the current master 12C, it is determined that the current master 12C has no capability in which the group address is assigned.

Meanwhile, in Step S15, when it is determined that the current master 12C has the capability in which the group address is assigned, the process advances to Step S16.

In Step S16, the current master 12C transmits a GET-GRPCAP command (refer to FIG. 6 to FIG. 8 to be described below) for instructing a request for transmission of the group-related capability information to all the I3C devices joining in the bus IF 11. In accordance with the above, when the current master 12C acquires the group-related capability information transmitted from each I3C device, the process advances to Step S17.

In Step S17, the current master 12C notifies the upper layer 22 of FIG. 2 of the group-related capability information acquired in Step S16. This process permits the upper layer 22 to grasp a correspondence of each I3C device to the group address and, for example, the upper layer 22 to determine the group address to be assigned to which I3C slave 13.

In Step S18, the current master 12C determines whether or not the group address is assigned to the I3C slave 13. For example, when the current master 12C is instructed to assign the group address by the upper layer 22 that performs determination on the basis of the group-related capability information, the current master 12C can determine the group address to be assigned to the I3C slave 13 in accordance with the instruction.

In Step S18, when the current master 12C determines that the assignment of the group address is performed, the process advances to Step S19. In Step S19, the current master 12C transmits the SETGRPA command (refer to FIG. 9 and FIG. 10 to be described below) for instructing the assignment of the group address and assigns the group address to the I3C slave 13 in accordance with the instruction from the upper layer 22.

Meanwhile, in Step S18, when the current master 12C determines that the assignment of the group address is not performed, or after the process of Step S19, the process advances to Step S20.

In Step S20, the current master 12C refers to the device information table held by the table holding unit 48 and determines whether or not the secondary master 12S having the capability in which the group address is assigned is present other than the current master 12C.

In Step S20, when the current master 12C determines that the secondary master 12S having the capability in which the group address is assigned is present, the process advances to Step S21.

In Step S21, the current master 12C transmits the DEFGRPS command (refer to FIG. 11 to FIG. 13 to be described below) for instructing information associated with the group address to be shared to the secondary master 12S having the capability in which the group address is assigned. Through this process, with the secondary master 12S having the capability in which the group address is assigned, the current master 12C shares the information associated with the group address of all the devices joining in the bus IF 11. As the information associated with the group address, for example, the current master 12C shares the group management capability information and the group-belonging capability information for each device joining in the bus IF 11. Further, when the group address is assigned to the I3C slave 13 in Step S19, the current master 12C shares the group address as the information associated with the group address.

In Step S20, when the current master 12C determines that the secondary master 12S having the capability in which the group address is assigned is not present, or after the process of Step S21, the process ends.

As described above, the current master 12C acquires the group-related capability information of all the I3C devices joining in the bus IF 11 to thereby recognize the I3C slave 13 having the group-belonging capability. This process permits the current master 12C to definitely assign the group address to the I3C slave 13 having the group-belonging capability.

Further, the current master 12C acquires the group-related capability information of all the I3C devices joining in the bus IF 11 to thereby recognize the secondary master 12S having the group management capability. This process permits the current master 12C to share the information associated with the group address with the secondary master 12S having the group management capability.

As described above, by sharing the information associated with the group address, in the bus IF 11, for example, there can be avoided a situation in which the address value already used by the other masters 12 is newly used as the group address and thereby the communication error occurs. Also, by sharing the information associated with the group address, in the bus IF 11, for example, there can be avoided a situation in which the group address set by the other masters 12 is rewritten and thereby the communication error occurs. Accordingly, in the bus IF 11, the communication error does not occur and communication can be performed more definitely and efficiently by using the group address.

Note that the process in which the current master 12C assigns the dynamic address and the group address is not limited to a procedure as described with reference to FIG. 4 and other procedures may be adopted.

Figure 5:
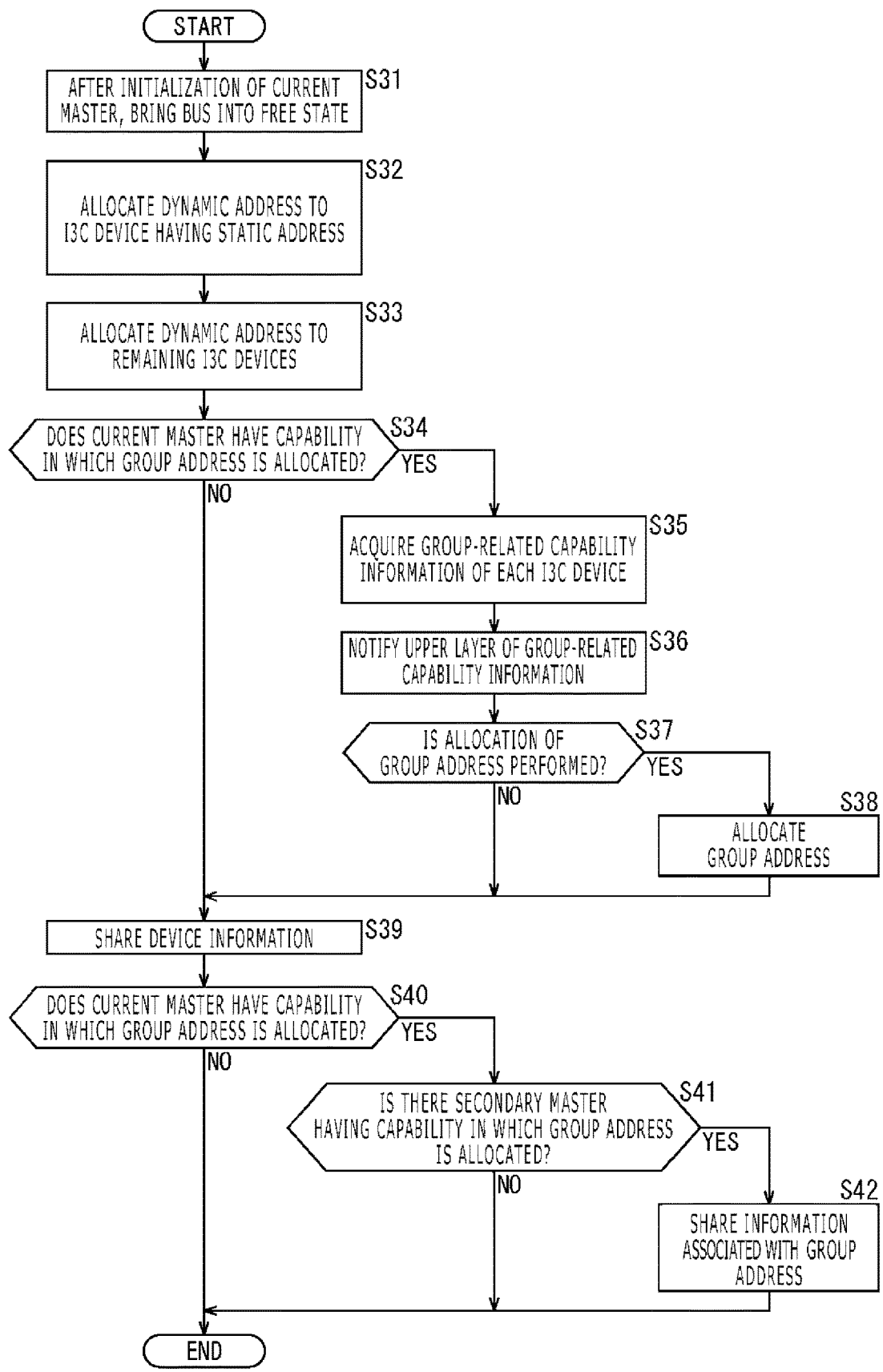
FIG. 5 is a flowchart describing a modification of a process for assigning the dynamic address and the group address.

For example, the current master 12C may assign the dynamic address and the group address by a procedure as illustrated in FIG. 5.

Figure 4:
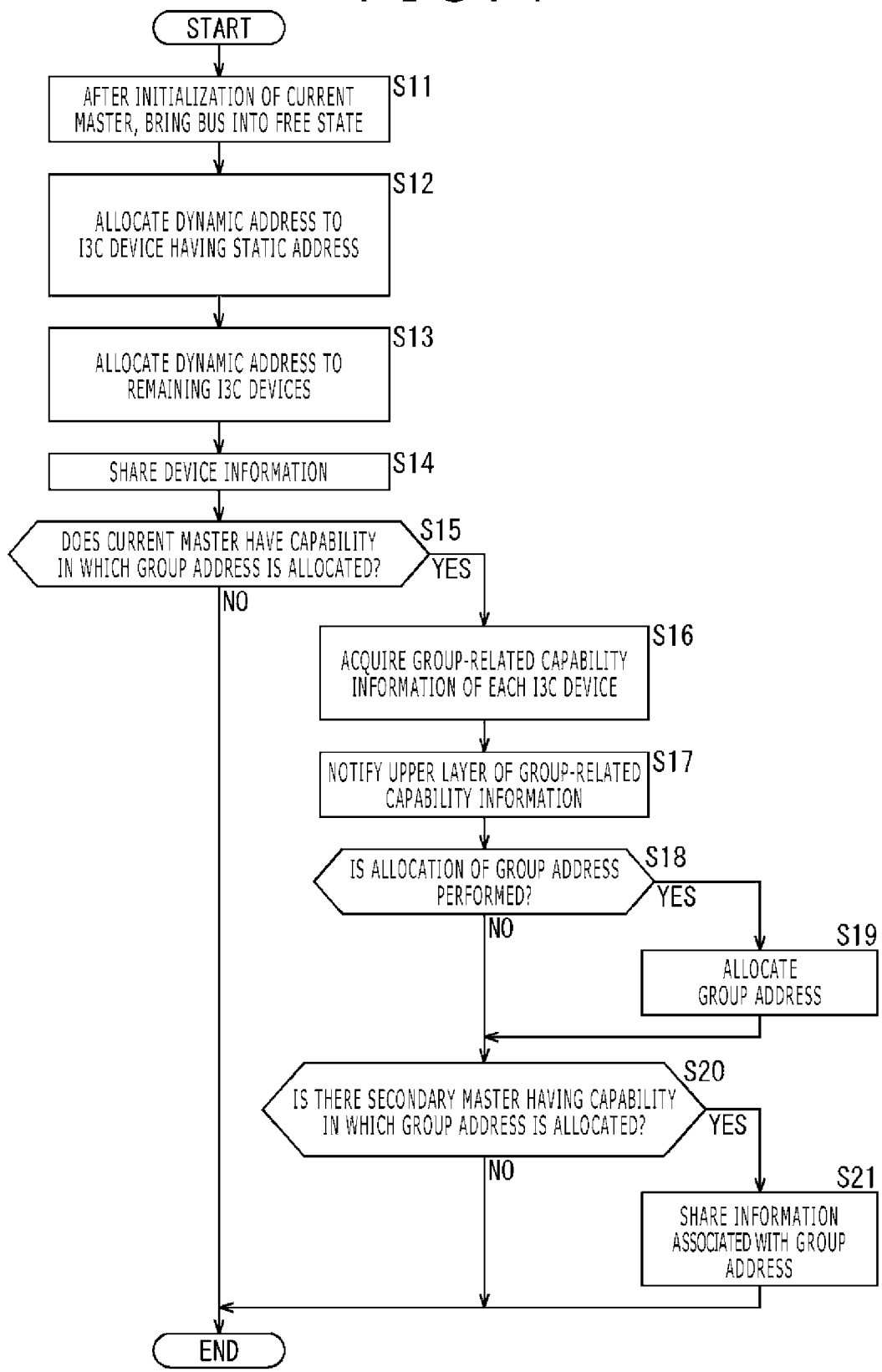
FIG. 4 is a flowchart describing a process for assigning a dynamic address and a group address.

That is, in a flowchart illustrated in FIG. 5, in Step S31 to Step S33, the similar processes as those of Step S11 to Step S13 of FIG. 4 are executed. Then, in Step S34, the current master 12C refers to the group-related capability information held by the information holding unit 46 and determines whether or not the current master 12C itself has the capability in which the group address is assigned.

In Step S34, when it is determined that the current master 12C has the capability in which the group address is assigned, in Steps S35 to S38, the similar processes as those of Steps S16 to S19 of FIG. 4 are executed and then the process advances to Step S39. Alternatively, in Step S34, when it is determined that the current master 12C has no capability in which the group address is assigned, the process advances to Step S39.

In Step S39, the current master 12C transmits the DEFSLVS command for instructing the device information to be shared to all the secondary masters 12S joining in the bus IF 11. This process permits the current master 12C to share the device information (the device ID, the function information, the static address, and the dynamic address) about all the devices joining in the bus IF 11 with the secondary master 12S.

Then, in Step S40, the current master 12C refers to the group-related capability information held by the information holding unit 46 and determines whether or not the current master 12C itself has the capability in which the group address is assigned.

In Step S40, when it is determined that the current master 12C has no capability in which the group address is assigned, the process ends. Meanwhile, in Step S40, when it is determined that the current master 12C has the capability in which the group address is assigned, in Steps S41 and S42, the similar processes as those of Steps S20 and S21 of FIG. 4 are executed and then the process ends.

As described above, in the bus IF 11, for example, the group address can be shared at the same time as the static address and the dynamic address.

<Format Example of GETGRPCAP Command>

In FIG. 6, a first format example of the GETGRPCAP command transmitted in Step S16 of FIG. 4 is illustrated.

As described above, the GETGRPCAP command instructs a request for the transmission of the group-related capability information to all the I3C devices joining in the bus IF 11.

In an example illustrated in FIG. 6, first, the current master 12C issues a start condition (S), transmits the address 7'h7E for designating all the devices joining in the bus IF 11, and continuously transmits a common command code (GETGRPCAP CCC) for requesting the group-related capability information to be transmitted. Then, in the wake of a restart (Sr), when the current master 12C transmits a Slave Address, the I3C slave 13 of the Slave Address sends back the group-related capability information (GRPCAP).

As illustrated in the figure, in the group-related capability information of 8 bits, a 0-th bit is a flag indicating whether or not the device has the group management capability, a first bit is a flag indicating whether or not the device has the group-belonging capability, and a second bit to a seventh bit are reserved. Accordingly, the I3C slave 13 that receives the common command code for requesting the group-related capability information to be transmitted and is designated by the Slave Address can allow the current master 12C to recognize the group-related capability information of the I3C slave 13 itself by using the flag indicating whether or not the device has the group-belonging capability.

That is, when the device receiving the GETGRPCAP command has the group management capability or the group-belonging capability, the device performs an ACK response. Further, the device having the group management capability transmits 1 to the flag indicating whether or not the device has the group management capability and the device having no group management capability transmits 0 to the flag indicating whether or not the device has the group management capability. In addition, the device having the group-belonging capability transmits 1 to the flag indicating whether or not the device has the group-belonging capability and the device having no group-belonging capability transmits 0 to the flag indicating whether or not the device has the group-belonging capability. In addition, the reserve area transmits 0 to all the flags.

Meanwhile, when the device receiving the GETGRPCAP command has no group management capability and group-belonging capability, the device needs to be regulated in I3C_v1.1 so that a NACK response is performed, or the ACK response is performed and then data is transmitted by ALL0. In the regulation of I3C_v1.0, for example, the device receiving the direct common command code (Direct CCC) not to be supported is regulated to perform the NACK response. Then, since the GETGRPCAP command is not regulated in the standard of I3C_v1.0, the device conforming to I3C_v1.0 necessarily performs the NACK response to the GETGRPCAP command.

As described above, by regulating the response to the GETGRPCAP command, even in the bus IF 11 in which the device conforming to I3C_v1.1 and the device conforming to I3C_v1.0 are mixed, the GETGRPCAP command can be operated without generating contradictions.

Note that since the GETGRPCAP command is a readout command, only the dynamic address can be designated to the Slave Address and the group address cannot be designated.

In addition, the master 12 having the capability in which the group address is assigned needs to be regulated in I3C_v1.1 so as to necessarily transmit the GETGRPCAP command as illustrated in FIG. 6. Meanwhile, the master 12 having no capability in which the group address is assigned needs to be regulated in I3C_v1.1 to be decided as the GETGRPCAP command as illustrated in FIG. 6 not being transmitted.

In FIG. 7, a second format example of the GETGRPCAP command is illustrated.

As illustrated in FIG. 7, the device receiving the GETGRPCAP command performs the ACK response and then transmits a first group-related capability information (GRPCAP1) and a second group-related capability information (GRPCAP2). In the first group-related capability information (GRPCAP5), the flag indicating whether or not the device has the group management capability is transmitted and, in the second group-related capability information (GRPCAP2), the group address assigned to the device itself is transmitted in addition to the flag indicating whether or not the device has the group-belonging capability. Note that the device in which the group address is not assigned and the device having no group-belonging capability transmit 7'h00 (prohibition of assignment) as the group address of the second group-related capability information.

In FIG. 8, a third format example of the GETGRPCAP command is illustrated.

As described above, the single I3C slave 13 can belong to a plurality of groups and it is possible to assign at least one or more of the group addresses to the single I3C slave 13. Accordingly, the I3C slave 13 that has received the GETGRPCAP command can notify the current master 12C of the number of the group addresses capable of being assigned to the I3C slave 13 itself.

As illustrated in FIG. 8, in the group-related capability information (GRPCAP), the number of slots (the number of assignable slots) of the group address is transmitted to a 0-th bit up to a second bit. Note that, for example, the device having no group-belonging capability transmits 0 to all the 0-th bit up to the second bit to thereby indicate the fact. In addition, a third bit to a sixth hit are reserved and the flag indicating whether or not the device has the group management capability is transmitted to a seventh bit.

Note that, in an example illustrated in FIG. 8, the number of the slots of the group address is represented by 3 bits; however, not limited thereto, a bit width can be decided in accordance with the maximum number of the slots in view of the standard.

By using the GETGRPCAP command of the format as described above, the current master 12C can recognize the group management capability and the group-belonging capability of all the devices joining in the bus IF 11.

<Format Example of SETGRPA Command>

Figure 9:
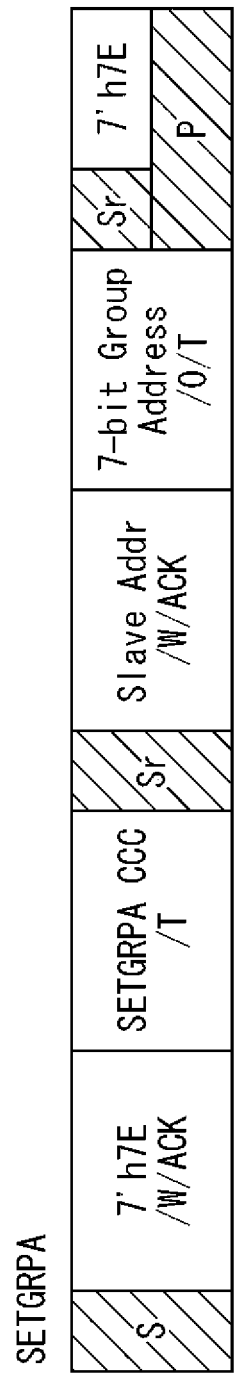
FIG. 9 is a diagram illustrating a first format example of a SETGRPA command.

In FIG. 9, a first format example of the SETGRPA command transmitted in Step S19 of FIG. 4 is illustrated.

In the example illustrated in FIG. 9, first, the current master 12C issues the start condition (S), transmits the address 7'h7E for designating all the devices joining in the bus IF 11, and continuously transmits a common command code (SETGRPA CCC) for instructing the assignment of the group address.

Then, the current master 12C transmits the Slave Address in the wake of the restart (Sr) and transmits the group address of the address value of 7 bits assigned to the I3C slave 13 of the Slave Address. Note that the dynamic address or the already-assigned group address can be designated to the here-transmitted Slave Address.

Then, when the device receiving the SETGRPA command has the group management capability or the group-belonging capability, the device performs the ACK response. Further, when the group address is not yet assigned, the device sets the received group address of the address value to the group address of the device itself. Alternatively, when the group address is already assigned, the device updates the received group address of the address value as the group address of the device itself.

Meanwhile, when the device receiving the SETGRPA command has no group management capability and group-belonging capability, the device has to perform the NACK response. In the standard of I3C_v1.0, for example, the device receiving the direct common command code (Direct CCC) not to be supported is regulated to perform the NACK response. Then, since the SETGRPA command is not regulated in the standard of I3C_v1.0, the device conforming to I3C_v1.0 necessarily performs the NACK response to the SETGRPA command.

In addition, the master 12 having the capability in which the group address is assigned needs to be regulated in I3C_v1.1 so as to necessarily transmit the SETGRPA command as illustrated in FIG. 9. Meanwhile, the master 12 having no capability in which the group address is assigned needs to be regulated in I3C_v1.1 to be decided as the SETGRPA command as illustrated in FIG. 9 not being transmitted.

In FIG. 10, a second format example of the SETGRPA command is illustrated.

As described above, the single I3C slave 13 can belong to a plurality of groups and it is possible to assign at least one or more of the group addresses to the single I3C slave 13.

Accordingly, the current master 12C transmits the common command code (SETGRPA CCC) for instructing the group address to be assigned, and then transmits valid flags for the assignable number and the address value of the group address to the I3C slave 13 of the Slave Address in the wake of the Slave Address.

Note that when a plurality of group addresses are assigned by the SETGRPA command only the dynamic address can be designated to the Slave Address and the group address is prohibited from being designated. That is, the dynamic address is used individually setting to a destination the I3C slave 13 and the assignment of the group address is performed.

In addition, the slot of valid=0 disables the group address and the slot of valid=1 enables the group address. Then, the current master 12C has to transmit bytes for setting the group address for the number of the slots of the group address of the device to which the group address is assigned. At this time, for example, when the number of the bytes is less than the number of the slots, the device sets the group address for the number of the received bytes and does not perform the setting for a shortfall. Alternatively, for example, when the number of the bytes is more than the number of the slots, the device neglects the bytes for a part exceeding the number of the slots.

By using the SETGRPA command of the format as described above, the current master 12C can assign the group address to the I3C device joining in the bus IF 11.

<Format Example of DEFGRPS Command>

In FIG. 11, a first format example of the DEFGRPS command transmitted in Step S21 of FIG. 4 is illustrated.

As described above, the masters 12 having the group management capability can mutually share the group-related capability information by using the DEFGRPS command.

In an example illustrated in FIG. 11, first, the current master 12C issues the start condition (S), transmits the address 7'h7E for designating all the devices joining in the bus IF 11, and continuously transmits the DEFGRPS command (DEFGRPS CCC) for instructing the information associated with the group address to be shared. Further, the current master 12C transmits the number (Count) of all the devices joining in the bus IF 11 recognized to be present by the current master 12C, that is, the number of combinations of data to be succeedingly transmitted.

In the next breath, the current master 12C transmits the dynamic address (DA), the group-related capability information (GRPCAP), the group address (GRPA), and GAvalid of the current master 12C itself. Then, the current master 12C repeatedly transmits the similar data for the number of all the devices joining in the bus IF 11. Note that with regard to the I3C device, the dynamic address (DA) is transmitted and, with regard to the I2C device, the static address (SA) is transmitted.

As the GAvalid, for example, when the I3C device has no group-belonging capability, 1'b0 is transmitted, when the I3C device has the group-belonging capability but the group address is not yet assigned, 1'b0 is transmitted, and when the I3C device has the group-belonging capability and the group address is already assigned, 1'b1 is transmitted. In addition, as the group address, when the I3C device has no group-belonging capability, 7'h00 is transmitted, when the I3C device has the group-belonging capability but the group address is not yet assigned, 7'h00 is transmitted, and when the I3C device has the group-belonging capability and the group address is already assigned, the address value is transmitted.

In addition, the master 12 having the capability in which the group address is assigned needs to be regulated in I3C_v1.1 so as to necessarily transmit the DEFGRPS command as illustrated in FIG. 11. Meanwhile, the master 12 having no capability in which the group address is assigned needs to be regulated in I3C_v1.1 to be decided as the DEFGRPS command as illustrated in FIG. 11 not being transmitted.

Even if receiving the DEFGRPS command, the master 12 having no capability in which the group address is assigned has to neglect the DEFGRPS command. In I3C_v1.0, for example, the device receiving the broadcast common command code (Broadcast CCC) to be supported is regulated to neglect the command. Since the DEFGRPS command is not regulated in the standard of I3C_v1.0, the device conforming to I3C_v1.0, necessarily neglects the DEFGRPS command.

Then, the master 12 having the capability in which the group address is assigned should be able to receive the DEFGRPS command.

In FIG. 12, a second format example of the DEFGRPS command is illustrated.

In the DEFGRPS command illustrated in FIG. 12, in the wake of the DEFGRPS command (DEFGRPS CCC), the current master 12C transmits the number (Count) of the I3C devices recognized to be present by the current master 12C, that is, the number of the combinations of data to be succeedingly transmitted. That is, it is evident that the I2C device has none of the group management capability and the group-belonging capability and only the I3C device may share the group-related capability information.

In the next breath, the current master 12C transmits the dynamic address (DA), the group management capability information (flag acquired by the GETGRPCAP command), the group address (GRPA), and the group-belonging capability information (flag acquired by the GETGRPCAP command) of the current master 12C itself. Then, the current master 12C repeatedly transmits the similar data for the number of the I3C devices. In addition, as the group address (GRPA), when the group address is not yet assigned, 7'h00 is transmitted and, when the group address is already assigned to the I3C device having the group-belonging capability information, the address value is transmitted.

Also, in the second format example of the DEFGRPS command illustrated in FIG. 12, information for a single device is transmitted being packed in a 2-byte area and information for the 12C device is prevented from being transmitted to thereby attempt to reduce the transmission data amount.

Figure 13:
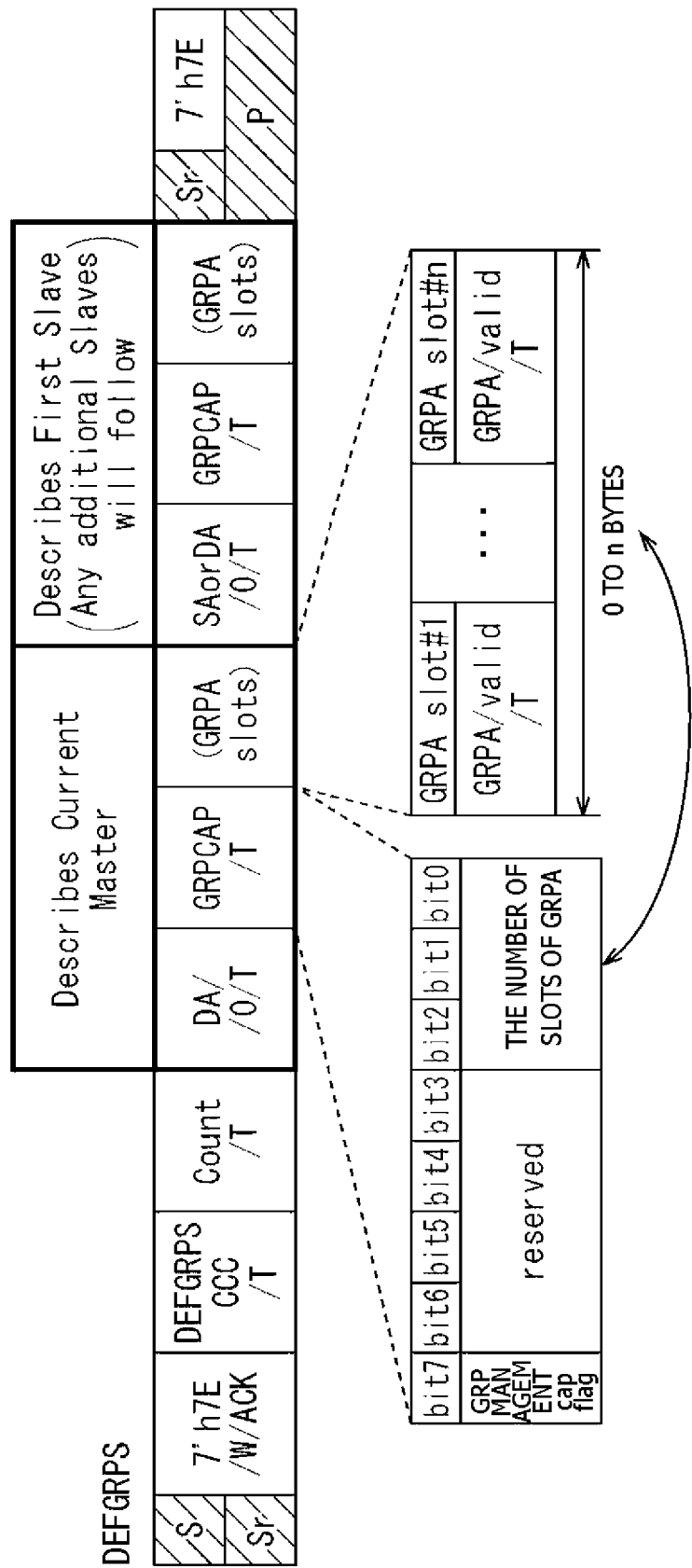
FIG. 13 is a diagram illustrating a third format example of the DEFGRPS command.

In FIG. 13, a third format example of the DEFGRPS command is illustrated.

In the DEFGRPS command illustrated in FIG. 13, in the wake of the DEFGRPS command (DEFGRPS CCC), the current master 12C transmits the number (Count) of all the devices joining in the bus IF 11 recognized to be present by the current master 12C, that is, the number of the combinations of data to be succeedingly transmitted.

In the next breath, the current master 12C transmits the dynamic address (DA), the group-related capability information (GRPCAP), the group address (GRPA), and the GAvalid of the current master 12C itself. At this time, in the group-related capability information (GRPCAP), the current master 12C transmits the number of the slots of the group address in the similar manner as in descriptions with reference to FIG. 8. Then, in the similar manner as in the descriptions with reference to FIG. 10, the group address and the valid flag for the number of bytes the same as the number of the slots of the group address are transmitted.

Also, in the third format example of the DEFGRPS command illustrated in FIG. 13, the information associated with the group address is transmitted for the number of the slots of the group address assignable for each device and the number of the slots of the group address.

By using the DEFGRPS command of the format as described above, with the secondary master 12S, the current master 12C can share the group address management capability, an assignment state of the group address, and the address value of the group address of the device joining in the bus IF 11.

<Communication Format Using Group Address>

The communication format used in the communication using the group address will be described with reference to FIG. 14 to FIG. 16.

Figure 14:
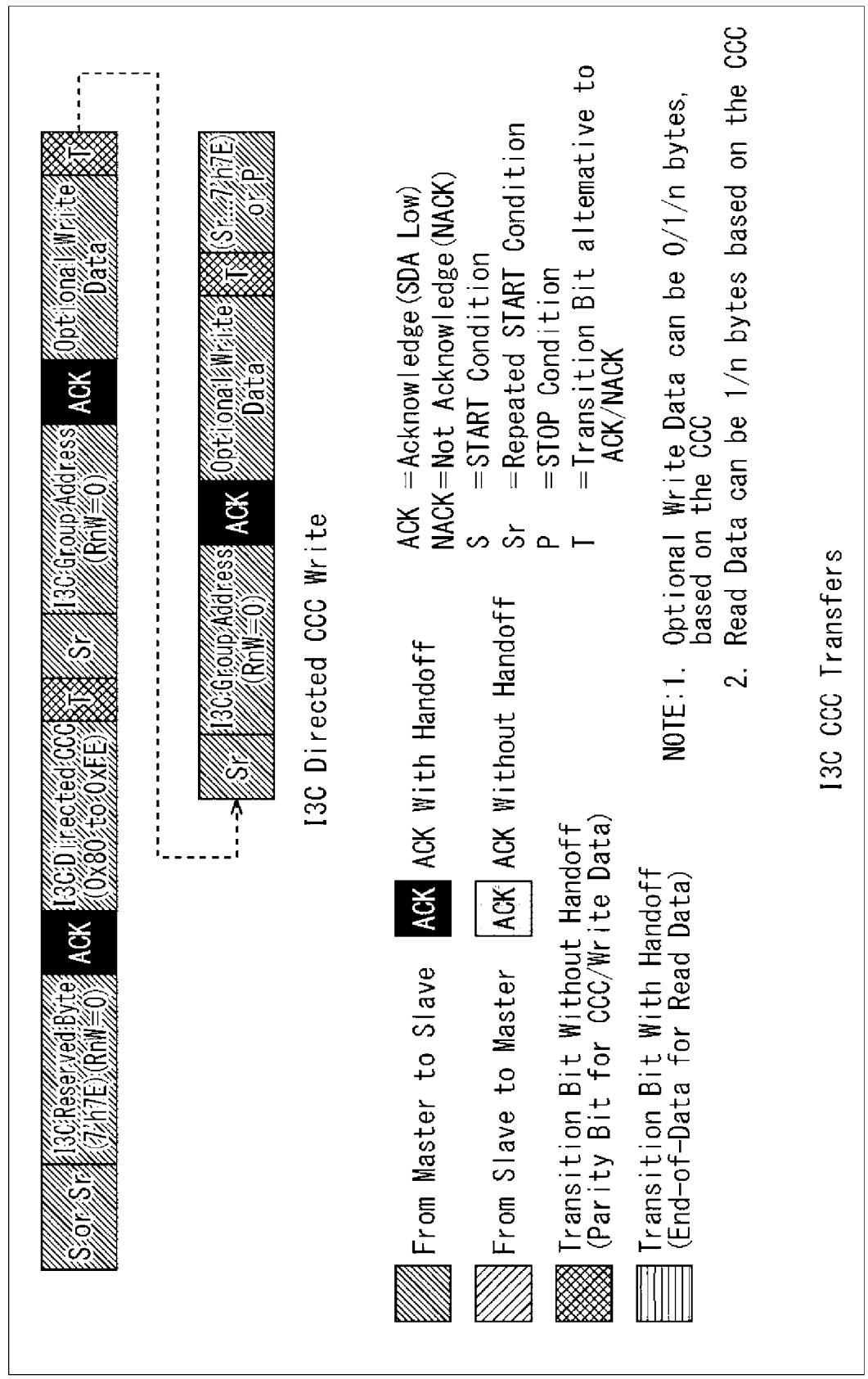
FIG. 14 is a diagram illustrating an example of a communication format in a write transfer.

In FIG. 14, an example of the communication format in the write transfer (I3C Directed CCC Write) is illustrated.

As illustrated in FIG. 14, the ACK is sent back from the I3C slave 13 to the group address (I3C Group Address) transmitted from the current master 12C setting to the destination a plurality of arbitrary I3C slaves 13, and then data (Optional Write Data) written setting the group to a target is transmitted. Then, transmission of the data in which the group address is set to the destination is performed for the necessary data amount.

Note that when multiple I3C slaves 13 send back the ACK and a portion of the I3C slaves 13 transmit the NACK among the plurality of I3C slaves 13 belonging to the same group, the current master 12C is also assumed to be incapable of recognizing the NACK but normal communication can be performed by performing correspondence using the error detection in subsequent communication processing.

In FIG. 15, an example of the communication format in the write transfer (I3C Private Write) and the readout transfer (I3C Private Read) is illustrated.

Among four communication formats illustrated in FIG. 15, two communication formats on the upper side represent those in the write transfer and two communication formats on the lower side represent those in the write transfer.

In the write transfer, the ACK is sent back from the I3C slave 13 to the group address (I3C Group Address) transmitted from the current master 12C setting to the destination the plurality of arbitrary I3C slaves 13 and then N pieces of data (Write Data-1 to Write Data-N) written setting the group to a target are transmitted.

In the readout transfer, with regard to the plurality of I3C slaves 13 belonging to the same group, N pieces of data (Read Data-1 to Read Data-N) are sequentially read out from respective I3C slaves 13. That is, the data read out from the plurality of I3C slaves 13 needs to be controlled so that a conflict is prevented from occurring and a timing at which the data is read out from the respective I3C slaves 13 is different from each other.

In FIG. 16, an example of the communication format in the write transfer (I3C Private Write) and the readout transfer (I3C Private Read) is illustrated.

In the similar manner as in the communication format illustrated in FIG. 15, in the write transfer, N pieces of data written setting the group to a target are transmitted and in the readout transfer, N pieces of data are sequentially read out for each I3C slave 13 of the same group.

In the group address (I3C Group Address) after the start condition (only S is included and Sr is not included), for example, the data transfer is performed at about 400 kHz by the open drain output from the current master 12C side. At this time, with regard to only a first one byte, the data transfer is performed by the open drain output and, with regard to subsequent bits (6 bit+R/W), the data transfer may be performed at 12.5 MHz by a push-pull output.

<Configuration Example of Computer>

Note that the respective processes described with reference to the above flowcharts are not necessarily executed in time series according to sequences described in the flowchart, but include processes (for example, parallel processes or processes by an object) that are executed in parallel or individually. In addition, a program may be processed by a single CPU or may be processed by a plurality of CPUs in a distributed manner.

In addition, the series of processes (communication method) described above can be executed by hardware or can be executed by software. When the series of processes are executed by the software, a program constituting the software is installed in a computer embedded in dedicated hardware or installed in, for example, a general-purpose personal computer in which various programs can be installed to execute various functions from a program recording medium in which a program is recorded.

FIG. 14 is a block diagram illustrating a configuration example (an example of a processing execution unit that executes the process executed by the master 12) of hardware of the computer that executes the series of processes described above by programs.

In the computer, a CPU (Central Processing Unit) 101, a ROM (Read Only Memory) 102, a RAM (Random Access Memory) 103, and an EEPROM (Electronically Erasable and Programmable Read Only Memory) 104 are connected to each other through a bus 105. An input and output interface 106 is further connected to the bus 105 and the input and output interface 106 is connected to the outside (for example, the data signal line 14 and the clock signal line 15 of FIG. 1).

In the computer configured as described above, the CPU 101 loads and executes the program stored in, for example, the ROM 102 and the EEPROM 104, in the RAM 103 through the bus 105, and thus the series of processes described above are executed. In addition, the program executed by the computer (CPU 101) may be written in advance in the ROM 102, or installed and updated in the EEPROM 104 from the outside through the input and output interface 105.

<Combination Example of Configuration>

In addition, the present technology may also take the following configurations.

(1)

A communication device having a communication initiative through a bus, including: a transmission and reception control unit configured to control transmission and reception of a signal with another communication device that performs communication under control of the communication device; and a processing execution unit configured to execute.

a process for recognizing the other communication device having a group-belonging capability capable of belonging to a group and performing communication to perform communication in which a group address is used setting a plurality of the other arbitrary communication devices to the single group and setting the group to a destination from among two or more of the other communication devices joining in the bus, and a process for assigning the group address to the other communication device recognized to have the group-belonging capability.

(2)

The communication device according to (1) above, in which the processing execution unit transmits a command for instructing the group address to be individually assigned as a destination to the other communication device having the group-belonging capability in a state in which the other communication device having the group-belonging capability and the other communication device having no group-belonging capability mixedly join in the bus.

(3)

The communication device according to (1) or (2) above, in which particular other communication devices that are capable of functioning as the communication device when the communication initiative is transferred from the communication device and that perform communication under control of the communication device when the communication initiative is not included can join in the bus, and the processing execution unit performs a process for recognizing the particular other communication devices having a group management capability capable of managing the group address and performing communication from among the particular other communication devices joining in the bus.

(4)
The communication device according to (3) above, in which the processing execution unit executes a process for sharing a recognition state of the group-belonging capability of the other communication device, a recognition state of the group management capability of the particular other communication devices, and an assignment state of the group address to the other communication device with the particular other communication devices recognized to have the group management capability.

(5)
The communication device according to (4) above, in which in a state in which a plurality of the particular other communication devices having the group management capability are connected to the bus,
the processing execution unit transmits a command for instructing information associated with the group address to be shared to thereby share the recognition state of the group-belonging capability of the other communication device, the recognition state of the group management capability of the particular other communication devices, and the assignment state of the group address to the other communication device.

(6)
A communication method performed by a communication device having a communication initiative through a bus, including the steps of:
controlling transmission and reception of a signal with another communication device that performs communication under control of the communication device;
executing a process for recognizing the other communication device having a group-belonging capability capable of belonging to a group and performing communication to perform communication in which a group address is used setting a plurality of the other arbitrary communication devices to the single group and setting the group to a destination from among two or more of the other communication devices joining in the bus; and
executing a process for assigning the group address to the other communication device recognized to have the group-belonging capability.

(7)
A program for causing a computer built in a communication device having a communication initiative through a bus to execute a process including the steps of:
controlling transmission and reception of a signal with another communication device that performs communication under control of the communication device;
executing a process for recognizing the other communication device having a group-belonging capability capable of belonging to a group and performing communication to perform communication in which a group address is used setting a plurality of the other arbitrary communication devices to the single group and setting the group to a destination from among two or more of the other communication devices joining in the bus; and executing a process for assigning the group address to the other communication device recognized to have the group-belonging capability.

(8)
A communication system in which communication is performed by a communication device having a communication initiative through a bus and another communication device performing communication under control of the communication device, in which
the communication device includes
a transmission and reception control unit configured to control transmission and reception of a signal with the other communication device, and
a processing execution unit configured to execute
a process for recognizing the other communication device having a group-belonging capability capable of belonging to a group and performing communication to perform communication in which a group address is used setting a plurality of the other arbitrary communication devices to the single group and setting the group to a destination from among two or more of the other communication devices joining in the bus, and
a process for assigning the group address to the other communication device recognized to have the group-belonging capability.

Note that the present embodiment is not limited to the embodiment described above and various modifications can be made without departing from the spirit and scope of the present disclosure. Also, the effects described in the present specification are merely illustrative and are not Imitative, and other effects may be described therein.

REFERENCE SIGNS LIST

11 Bus IF
12-1 to 12-3 Master
13-1 to 13-6 Slave
14 Data signal line
15 Clock signal line
21 Master device
22 Upper layer
31 Slave device
32 Upper layer
41 Transmission and reception control unit
42 Data reception unit
43 Data transmission unit
44 Mastership request control unit
45 Command interpretation unit
46 Information holding unit
47 Command transmission unit
48 Table holding unit
51 Transmission and reception control unit
52 Data reception unit
53 Data transmission unit
54 Hot join request control unit
55 Dynamic address holding unit
56 Group address holding unit
57 Command interpretation unit
58 Information holding unit

The invention claimed is:
1. A primary communication device having a communication initiative through a bus, the primary communication device comprising:
communication circuitry configured to communicate with a plurality of secondary communication devices, wherein the plurality of secondary communication devices are configured to perform communication under control of the primary communication device; and control circuitry configured to:
  cause the primary communication device to assign a respective dynamic address to each of the plurality of secondary communication devices,
  cause the primary communication device to acquire a respective capability information from at least one of the plurality of secondary communication devices, and
  cause the primary communication device to assign a respective group address to at least one of the plurality of secondary communication devices and to set the respective group address in the at least one of the plurality of secondary communication devices.

2. The primary communication device according to claim 1, wherein the control circuitry is configured to determine whether one of the plurality of second communication devices has a capability to have the communication initiative through the bus and has a capability to perform a group address assignment.

3. The primary communication device according to claim 2, wherein, in a case where the control circuitry determines that the one of the plurality of second communication devices has the capability to have the communication initiative through the bus and has the capability to perform the group address assignment, the control circuitry is configured to cause the primary communication device to inform the one of the plurality of second communication devices of the assigned group addresses.

4. The primary communication device according to claim 3, wherein the control circuitry is configured to cause the primary communication device to inform the one of the plurality of second communication devices of the assigned group addresses by transmitting a first command, and
  the first command includes a first command code, a count, an information regarding the primary communication device, and an information regarding at least one of the plurality of second communication devices.

5. The primary communication device according to claim 1, wherein the control circuitry is configured:
  to determine whether one of the plurality of second communication devices has a capability to have the communication initiative through the bus, and
  in a case where the control circuitry determines that the one of the plurality of second communication devices has the capability to have the communication initiative through the bus, to cause the primary communication device to inform the one of the plurality of second communication devices of a respective device information for each of the plurality of second communication devices.

6. The primary communication device according to claim 5, wherein the respective device information includes one or more selected from the group consisting of: a device ID, a function information, a static address, and/or the assigned dynamic address.

7. The primary communication device according to claim 1, wherein the control circuitry is configured to cause the primary communication device to set the respective group address by transmitting a second command to the at least one of the plurality of secondary communication devices, and
  the second command includes a second command code, the assigned dynamic address, and the respective group address.

8. The primary communication device according to claim 1, wherein the control circuitry is configured to cause the primary communication device to issue a read command, and the group address is prohibited to be designated in the read command.

9. The primary communication device according to claim 1, wherein the respective capability information includes information corresponding to an I3C version state of the corresponding second communication device.

10. The primary communication device according to claim 1, wherein the respective capability information includes information representing a number of assignable group address slots of the corresponding second communication device.

11. The primary communication device according to claim 1, wherein the communication circuitry and/or the control circuitry are respectively configured from a semiconductor integrated circuit.

12. The primary communication device according to claim 1, wherein the control circuitry is configured to cause the primary communication device to issue a write command to those among the plurality of secondary communication devices having a particular group address.

13. The primary communication device according to claim 12, wherein the primary communication device is configured to receive an acknowledgement from those among the plurality of secondary communication devices having the particular group address, in response to the write command.

14. The primary communication device according to claim 1, further comprising a register configured to store the respective capability information acquired from the at least one of the plurality of second communication devices.

15. A communication method performed by a primary communication device having a communication initiative through a bus, the method comprising:
  communicating with a plurality of secondary communication devices, wherein the plurality of secondary communication devices are configured to perform communication under control of the primary communication device;
  causing the primary communication device to assign a respective dynamic address to each of the plurality of secondary communication devices;
  causing the primary communication device to acquire a respective capability information from at least one of the plurality of secondary communication devices; and
  causing the primary communication device to assign a respective group address to at least one of the plurality of secondary communication devices and to set the respective group address in the at least one of the plurality of secondary communication devices.

16. A communication system comprising:
  a primary communication device having a communication initiative, through a bus; and
  a plurality of secondary communication devices configured to perform communication under control of the primary communication device, wherein
  the primary communication device includes:
    communication circuitry configured to communicate with the plurality of secondary communication devices, and
    control circuitry configured to:
      cause the primary communication device to assign a respective dynamic address to each of the plurality of secondary communication devices, cause the primary communication device to acquire a respective capability information from at least one of the plurality of secondary communication devices, and cause the primary communication device to assign a respective group address to at least one of the plurality of secondary communication devices and to set the respective group address in the at least one of the plurality of secondary communication devices.

* * * * *